United States Patent Office 3,352,663
Patented Nov. 14, 1967

3,352,663
METHOD OF DESTROYING A WEED
Heinz Eberhard Freund, Friedrich Arndt, and Reinhart Rusch, Berlin, Germany, assignors to Schering, A.G., Berlin, Germany
No Drawing. Filed June 1, 1964, Ser. No. 371,824
Claims priority, application Germany, June 26, 1963, Sch 33,461
10 Claims. (Cl. 71—2.5)

This invention relates to active herbicidal agents, and more particularly to selective herbicides.

A primary object of the invention is the selective destruction of weeds from mingled stands of said weeds and of crop plants without damaging the latter.

Another object is the provision of compounds which combine herbicidal effectiveness against a wide variety of weeds with harmless affects toward a wide variety of crop plants.

More specifically, the invention aims to provide effective weed killing agents which do not damage crop plants when applied to portions of the crop plants above ground, particularly the leaves.

Heretofore, there have been many otherwise excellent known herbicides which are deleterious to crop plants when they come into contact with the leaves of the same. Because of such disadvantage, such herbicides are therefore limited in their application to weeds which emerge before the crop plants. Drifting of such herbicides to adjacent fields carrying fully emerged crops must be carefully guarded against, and aerial application of these known herbicides is difficult if at all possible.

It has now been found that N-furanoylaniline and certain derivatives thereof are effective against a wide spectrum of weeds, and harmless to an equally wide spectrum of crop plants. The selective herbicidal agents of the invention have the formula

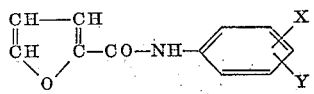

wherein X may be hydrogen, a halogen, lower alkyl, lower alkoxy, $NO_2$, or w-trifluoro-(lower) alkyl, and Y is hydrogen, a halogen, or lower alkyl.

The optimum rate of application of the herbicidal agents of the invention varies with their chemical composition, the nature of the crop plants and weeds to be treated, and the stage of development of the weeds and crops. As a general rule, 2 to 5 kg. of the active agent when applied to one hectare (ha.) produce the desired result. (1 hectare is equal to 2.471 acres.) Many crop plants, however, readily tolerate as much as 10 kg./ha. of the most active agents without suffering damage. The good tolerance of many crop plants for the selective herbicides of the invention makes it possible to use them on multiple crops, for example, a cereal crop having an undercrop of clover or grass.

The herbicidal agents of the invention may be applied by all conventional methods in all forms in which weed killers are normally applied. Compositions containing a herbicidal agent of the invention as the active ingredient may be solid or liquid. The solid compositions may consist of loose fine powders or of granular particles. The liquid compositions may be solutions, emulsions, or suspensions of the active agents. The compositions may further contain liquid or solid inert carriers and diluents, and also surface active agents as is usual in this art.

Suitable liquid carriers and diluents are water, mineral oil and other organic solvents such as xylene, cyclohexanol, cyclohexanone, chloroform, carbon tetrachloride, dimethylformamide, dimethylsulfoxide, and the like. Solid carriers suitable for the active agents of the invention include powdered limestone, kaolin, chalk, talcum, attaclay and other clay materials. Preferred surfactants include the salts of lignosulfonic acid, salts of alkylated benzenesulfonic acids, sulfonated acid amides and their salts, polyethoxylated amines and alcohols.

Each compound of the invention may be used as the sole active agent in a herbicidal composition, or it may be combined with other compounds of the invention, with other crop protecting agents or pesticides, and with such other agricultural chemicals as fertilizers.

The concentration of the herbicidal agents of the invention in the various types of compositions which readily suggest themselves to those skilled in the art may vary so widely, that it is not possible to provide general rules which would be meaningful under the many conditions of use which are affected by the nature of the composition, such as, the manner in which it is prepared, the manner in which it is to be applied, the desired result, the type and condition of the weeds to be destroyed, and the like.

In view of the state of this art, those who are skilled in this field will find sufficient guidance in the examples of specific applications which will presently be described.

The compounds of the invention are prepared from 2-furanoylchloride and aniline or its derivatives in the presence of an acid acceptor in the manner commonly employed in the preparation of acyl anilides.

The following examples are further illustrative of this invention, and it will be understood that the invention is not limited thereto.

Example 1

Plants of mustard (Sinapis sp.), corn, and wheat were uniformly sprayed in a greehouse test with 2% aqueous suspensions of herbicides of the invention. The plants were after germination and the spray was mainly applied to their parts above ground. The results observed after 14 days were evaluated on an arbitrary scale on which 0 indicates the absence of a visible difference from untreated control plants, and 10 indicates complete destruction.

The compounds employed and the results with the three types of test plants are listed in Table 1. The compounds have the general formula

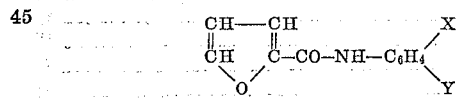

and only the substituents X and Y are identified in the table.

TABLE 1

| Substituent | | Effect on— | | |
|---|---|---|---|---|
| X | Y | Mustard | Corn | Wheat |
| H | H | 10 | 2 | 1 |
| 2-Cl | H | 3 | 0 | 0 |
| 3-Cl | H | 10 | 0 | 0 |
| 4-Cl | H | 10 | 0 | 0 |
| 2-Cl | 5-Cl | 10 | 0 | 0 |
| 3-Cl | 4-Cl | 10 | 0 | 0 |
| 4-Br | H | 5 | 0 | 0 |
| 2-CH₃ | H | 9 | 0 | 0-1 |
| 3-CH₃ | H | 10 | 0 | 0 |
| 4-CH₃ | H | 10 | 1 | 0 |
| 2-CH₃ | 4-CH₃ | 3 | 0 | 0 |
| 2-CH₃ | 5-CH₃ | 10 | 0 | 0-1 |
| 2-CH₃ | 4-Cl | 9 | 0 | 0 |
| 3-Cl | 4-CH₃ | 9-10 | 1 | 0 |
| 3-CF₃ | H | 9-10 | 0 | 0 |
| 2-NO₂ | H | 6 | 0 | 0 |
| 3-NO₂ | H | 7 | 0 | 0 |
| 4-NO₂ | H | 6 | 0 | 0 |
| 2-Ethoxy | H | 3 | 0 | 0 |
| 4-Methoxy | H | 10 | 0 | 0 |
| 4-Ethoxy | H | 6 | 0 | 0 |

The herbicides of the invention cause very little damage, if any, to the crop plants corn and wheat in amounts which entirely, or almost entirely destroy the mustard weed. Even the least effective herbicides of the invention, when employed in the amounts of this test, cause significant damage to the weed while not affecting the crop plants to a measurable extent.

*Example 2*

Soil seeded with mustard was sprayed with 2% aqueous suspensions of herbicides of the invention prior to germination of the mustard. The effects of the spray treatment were evaluated 14 days later in the manner described in Example 1. The results obtained are tabulated in Table 2 in the same manner as in Table 1.

TABLE 2

| Substituent | | Effect on Mustard |
|---|---|---|
| X | Y | |
| 3-Cl | H | 1-2 |
| 2-Cl | 5-Cl | 2-3 |
| 2-CH$_3$ | H | 9 |
| 2-CH$_3$ | 4-CH$_3$ | 5 |
| 2-CH$_3$ | 5-CH$_3$ | 10 |
| 2-CH$_3$ | 4-Cl | 6-7 |
| 4-Methoxy | H | 6-7 |

As is seen from Table 2, the herbicidal compounds are effective in damaging or destroying weed plants which emerge from soil superficially treated with the compounds.

*Example 3*

Suspensions of the herbicidal compounds of the invention listed in Table 3 were sprayed on crop plants and on weeds infesting the crops. The suspensions were applied at a rate of 800 liters per hectare, and contained 3 kilograms of the active agent listed per 800 liters. The results achieved were evaluated in the manner described in Example 1.

The several test plants are identified in Table 3 by their initials as follows:

Corn _____ C
Wheat _____ W
Turnips _____ Tu
Onions _____ O
Tomatoes _____ To
*Stellaria media* _____ St
*Galinsoga parv.* _____ G
*Sinapis sp.* _____ Si
*Urtica urens* _____ U
*Senecia vulg.* _____ Se
*Matricaria chamomilla* _____ M

*Example 4*

The representative herbicides of the invention listed in Table 4 were applied to four types of cereal crops having red clover as an undercrop. The herbicides were applied as aqueous suspensions at a rate of 10 kilograms of active agent in 1000 liters water per hectare. Although the rate of application was more than three times that of Example 3, and more than adequate to deal with the weeds enumerated there, the cereal crops were not noticeably affected. These crops were barley, oats, rye, and wheat. The very slight effects on the red clover, if any, are listed in Table 4. These results are closely similar to those obtained with grass undercrops.

TABLE 4

| Substituent | | Effect on Red Clover |
|---|---|---|
| X | Y | |
| H | H | 1 |
| 3-Cl | H | 0 |
| 4-Cl | H | 1-2 |
| 3-Cl | 4-Cl | 0 |
| 3-CH$_3$ | H | 2-3 |
| 4-CH$_3$ | H | 0-1 |

*Example 5*

The use of emulsified herbicides is not new, and the well known methods for preparing liquid herbicidal compositions in which the active agent is present in a colloidally dispersed liquid phase are generally applicable to the herbicides of this invention. The following formulation has been found to be particularly well adapted to our compounds. The ingredients are mixed by agitation. The percentages indicated are by weight:

| | Percent |
|---|---|
| Herbicidal agent | 10 |
| Xylene | 70 |
| Dimethylformamide | 15 |
| Calcium dodecylbenzene-sulfonate (emulsifier) | 5 |

The above solution formed emulsifies readily when combined with water.

*Example 6*

A solid composition containing the herbicidal compounds of the invention is readily prepared from the following ingredients by grinding in a ball mill:

| | Percent |
|---|---|
| Herbicidal agent | 20 |
| Attaclay | 70 |
| Calcium lignosulfonate | 8 |
| Sodium beta-(oleylmethylamino ethanesulfonate (wetting agent) | 2 |

TABLE 3

| Substituent | | Effect on | | | | | | | | | |
|---|---|---|---|---|---|---|---|---|---|---|---|
| X | Y | C | W | Tu | O | To | St | G | Si | U | Se | M |
| H | H | 0 | 0 | 0 | 0 | 0 | 10 | 10 | 10 | 10 | 10 | 8 |
| 3-Cl | H | 0 | 0 | 0 | 0 | 1 | 9 | 9 | 10 | 10 | 0 | 7 |
| 4-Cl | H | 0 | 0 | 0 | 0 | 0 | 7 | 7 | 9 | — | — | — |
| 3-Cl | 4-Cl | 0 | 0 | 0 | 0 | 0 | 2 | 5 | 7 | — | — | — |
| 3-CH$_3$ | H | 0 | 0 | 0 | 0 | 0 | 10 | 9 | 8 | 10 | 1 | 0 |
| 4-CH$_3$ | H | 0 | 0 | 0 | 0 | 0 | 4 | 9 | 7 | — | — | — |
| 3-Cl | 4-CH$_3$ | 0 | 0 | 0 | 0 | 0 | 7 | 4 | 5 | — | — | — |
| 4-Methoxy | H | 0 | 0 | 0 | 0 | 0 | 9 | 9 | 8 | 10 | 7 | 8 |
| 3-CF$_3$ | — | 0 | 0 | 0 | — | — | 5 | 4 | 6 | — | — | — |

Not all compounds tested were applied to all weeds as indicated by dashes in Table 3, but the results of this field test fully support the conclusions drawn from the more limited greenhouse tests. The lack of harmful effects on the varied crops is as surprising as the deleterious effects on a wide variety of weeds.

The powder mixture obtained readily disperses in water, and the dispersion or suspension obtained is suitable for use as described in Examples 1 to 3. It may be diluted with solid carriers and applied as a dust.

While the invention has been described with particular reference to specific embodiments, it is to be under-

We claim:
1. A method of destroying a weed which comprises applying to portions of said weed above ground a herbicidal amount of a compound having the formula

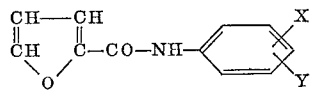

wherein X is a member of the group consisting of hydrogen, halogen, nitro, lower alkyl, lower alkoxy, and ω-trifluoro-(lower)-alkyl, and Y is a member of the group consisting of hydrogen, halogen, and lower alkyl.

2. A method as set forth in claim 1, wherein at least one of said X and Y is methyl.
3. A method as set forth in claim 1, wherein at least one of said X and Y is chlorine.
4. A method as set forth in claim 1, wherein X is bromine.
5. A method as set forth in claim 1, wherein X is methoxy.
6. A method as set forth in claim 1, wherein X is ethoxy.
7. A method as set forth in claim 1, wherein X is trifluoromethyl.
8. A method as set forth in claim 1, wherein X is the nitro radical.
9. A method of destroying a weed which comprises applying to the surface of soil containing a seed of said weed prior to emergence of said weed from said soil a herbicidal amount of a compound having the formula

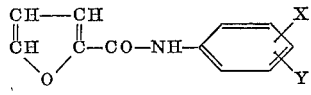

wherein X is a member of the group consisting of hydrogen, halogen, nitro, lower alkyl, lower alkoxy, and ω-trifluro-(lower)-alkyl, and Y is a member of the group consisting of hydrogen, halogen, and lower alkyl.

10. A method of protecting a crop from infesting weeds which comprises applying to portions of said crop and of said weeds above ground a herbicidal amount of an active agent, said amount being smaller than an amount which would substantially damage said crop, said active agent being a compound having the formula

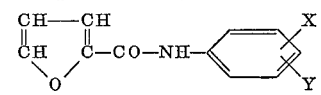

wherein X is a member of the group consisting of hydrogen, halogen, nitro, lower alkyl, lower alkoxy, and ω-trifluro-(lower)-alkyl, and Y is a member of the group consisting of hydrogen, halogen, and lower alkyl.

References Cited
UNITED STATES PATENTS
3,266,883   8/1966   Leon et al. _____ 71—2.5

LEWIS GOTTS, *Primary Examiner.*

JAMES O. THOMAS, JR., *Examiner.*

G. HOLLRAH, *Assistant Examiner.*